US010642982B2

United States Patent
Ahuja et al.

(10) Patent No.: US 10,642,982 B2
(45) Date of Patent: *May 5, 2020

(54) SYSTEMS AND METHODS FOR ADDING MICROSERVICES INTO EXISTING SYSTEM ENVIRONMENTS

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Meni Hillel, San Jose, CA (US); John Richard Guzik, Sunnyvale, CA (US)

(73) Assignee: SHIELDX NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,411

(22) Filed: Jul. 2, 2018

(65) Prior Publication Data
US 2019/0138728 A1    May 9, 2019

Related U.S. Application Data

(63) Continuation of application No. 15/396,219, filed on Dec. 30, 2016, now Pat. No. 10,013,550.

(51) Int. Cl.
*G06F 21/57* (2013.01)
*H04L 29/06* (2006.01)
(Continued)

(52) U.S. Cl.
CPC ............ *G06F 21/57* (2013.01); *G06F 21/50* (2013.01); *G06F 21/55* (2013.01); *G06F 21/56* (2013.01);
(Continued)

(58) Field of Classification Search
None
See application file for complete search history.

(56) References Cited

U.S. PATENT DOCUMENTS 9,467,476 B1    10/2016   Shieh et al.
9,716,617 B1 *   7/2017   Ahuja ................. H04L 67/1031
(Continued)

OTHER PUBLICATIONS

International Search Report and Written Opinion for Application No. PCT/US2017/068824, dated Mar. 15, 2018, 13 pages.
(Continued)

*Primary Examiner* — Benjamin E Lanier
(74) *Attorney, Agent, or Firm* — Nicholson De Vos Webster & Elliott LLP

(57) ABSTRACT

Systems and methods are disclosed that relate to network security within a virtual network, and how to add microservices in a scalable virtual network. For example, one embodiment discloses a method of receiving a deployment request to deploy a security microservice in a security service, the deployment request including a deployment specification. The method further includes determining whether an interface microservice is available on one or more hosts by accessing one or more host records for the one or more hosts, and selecting a host on which to deploy the security microservice utilizing the deployment specification. When the interface microservice does not exist on the selected host, the method further includes initializing the interface microservice on the selected host, attaching the interface microservice to a hypervisor of the selected host, connecting the security microservice to the interface microservice of the selected host, and deploying the security microservice on the selected host.

20 Claims, 10 Drawing Sheets

(51) Int. Cl.
    *G06F 21/50*     (2013.01)
    *G06F 21/55*     (2013.01)
    *G06F 21/56*     (2013.01)
    *G06F 9/455*     (2018.01)
    *H04L 29/08*     (2006.01)
    *G06F 9/50*     (2006.01)

(52) U.S. Cl.
    CPC ...... *H04L 63/1425* (2013.01); *G06F 9/45558* (2013.01); *G06F 9/50* (2013.01); *G06F 2009/45587* (2013.01); *G06F 2009/45595* (2013.01); *G06F 2221/034* (2013.01); *H04L 67/1008* (2013.01)

(56) References Cited

U.S. PATENT DOCUMENTS

2011/0231552 A1    9/2011    Carter et al.
2012/0131193 A1    5/2012    Ferris et al.

OTHER PUBLICATIONS

Scholler M., et al., "Resilient Deployment of Virtual Network Functions," 2013 5th International Congress on Ultra Modern Telecommunications and Control Systems and Workshops, Sep. 1, 2013, pp. 208-214.
Corrected Notice of Allowance from U.S. Appl. No. 15/396,219, dated Apr. 27, 2018, 7 pages.
Non-Final Office Action from U.S. Appl. No. 15/396,219, dated Dec. 14, 2017, 8 pages.
Notice of Allowance from U.S. Appl. No. 15/396,219, dated Apr. 12, 2018, 5 pages.

\* cited by examiner

SYSTEMS AND METHODS FOR ADDING MICROSERVICES INTO EXISTING SYSTEM ENVIRONMENTS

RELATED APPLICATION

This application is related to and claims priority to U.S. patent application Ser. No. 15/396,219, entitled "SYSTEMS AND METHODS FOR ADDING MICROSERVICES INTO EXISTING SYSTEM ENVIRONMENTS" filed on Dec. 30, 2016, now U.S. patent Ser. No. 10/013,550, which is hereby incorporated by reference in its entirety.

TECHNICAL FIELD

Embodiments described herein generally relate to network security. In particular, embodiments described generally relate to systems and methods for adding microservices into an existing virtual network environment.

BACKGROUND INFORMATION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The expansion of cloud computing services has led to collections of servers to provide computing capacity to run various client applications. These collections of servers, or virtual network, can function as a data center, but can be spread out in various locations. Data security and monitoring network traffic is a requirement in such virtual networks. Data traveling between servers and client applications needs to be monitored for security. With the expansion of cloud computing services has come an expansion of the amount of network traffic and data that is expected to be handled by these cloud computing services. Thus, one problem to be addressed is how these cloud computing services efficiently handle increasing amounts of network traffic to be processed by security microservices.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
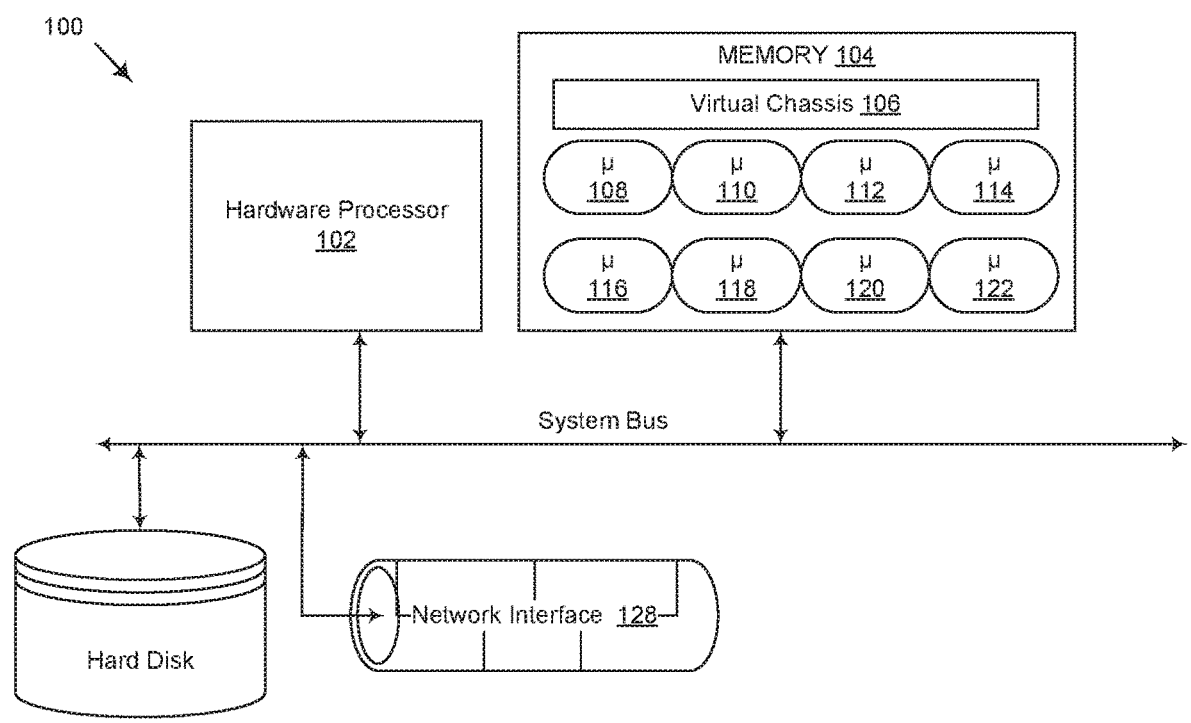
FIG. 1 is a block diagram illustrating computer hardware for loading network security microservices from a memory and executing them by a processor in accordance with the disclosed embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Addressing the security needs of increasing amounts of network traffic to be processed by security microservices requires the ability to efficiently add security microservices. Security microservices can be added by deploying the security microservices utilizing existing hosts with an interface microservice and available resources sufficient to handle the new security microservices. In some embodiments, security microservices can be added by deploying the security microservices on a host without an interface microservices by performing a process of initializing an interface microservice on the host.

Embodiments implements a method of managing the addition of security microservices to a scalable, stateless microservice security system. In some embodiments, the method comprises a deployment factory receiving a deployment request to deploy a new security microservice in a security service. The deployment request may be received from an existing microservice in the security service, or may be generated by the security service itself based on an analysis of a load amount of existing microservices in the system. In some embodiments, the deployment request includes a deployment specification that defines the requirements for the requested new security microservice. The deployment factory selects a host based on information regarding one or more existing hosts contained in one or more host records stored in a deployment database. In some embodiments, the deployment factory determines on which available host to deploy the security microservice based on determining whether an interface microservice is available on the selected host. In some embodiments, the deployment factory utilizes the requirements defined in the deployment request to determine on which available host to deploy the new security microservice. In some embodiments, the deployment factory initializes a new interface microservice on an available host when the interface microservice does not exist on the selected host. In such embodiments, the deployment factory attaches the initialized interface microservice to a hypervisor associated with the selected host, connects the requested security microservice to the interface microservice, and deploys the new security microservice on the selected host.

In additional embodiments, in response to receiving the deployment request, the deployment factory polls existing security microservices for hosts in the system. The deployment factory may retrieve utilization histories for the hosts in the system, where the utilization history can include one or more of a compute utilization history, a memory utilization history, a storage utilization history, and a network utilization history. Based on an analysis of the utilization histories, the deployment factory can update the received deployment specification.

FIG. 1 is a block diagram illustrating computer hardware for loading network security microservices from a memory and executing them by a processor in accordance with the disclosed embodiments. Network security microservices 108-122 are stored in memory 104 (e.g., volatile memory such as Random Access Memory (RAM) and/or non-volatile memory such as disk) and executed by one or more hardware processors or processor cores 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, a network security system 100 utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices stored in memory 104. A network interface 128 (e.g., fabric or interconnect that is wired or wireless) provides a means for communicating with a data center. Network security system 100 may inspect traffic, detect threats, and otherwise protects a data center using the microservices 108-122.

Embodiments of a network security system 100 providing the above capabilities are now discussed in more detail. Network security system 100 adds security to, or enhances the security of, a datacenter or other computing environment. In an embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, a network security system 100 utilizes a network interface 128 to explore the datacenter and to discover existing network segments, determine security settings to apply to various network segments, detect available hosts and hardware resources, and determine additional configuration information as needed. In an embodiment, the datacenter itself includes several machines with hypervisors, or physical hardware, and the network security system 100 offers microservices to communicate with and protect one or more of those internal virtual machines or physical hardware. Based on performing datacenter discovery, a network security system 100, in some embodiments, may then offer or suggest available security tools for selection either through a graphical interface or via connections with existing enterprise management software. In one embodiment, once configured, a network security system 100 is deployed "in-line," receiving packets headed for the datacenter, thereby allowing network security system to intercept and block suspicious traffic before it reaches the datacenter. With an understanding of the datacenter, a network security system 100 deploys microservices to inspect traffic throughout the datacenter, and not only at ingress. In some embodiments, a network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In an embodiment, the microservices are small in size, consisting of a relatively small number of instructions. In an embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

In an embodiment, a network security system 100 receives traffic via network interface 128 to/from a datacenter. In one embodiment, a network security system 100 is placed in-line to inspect traffic, and potentially intercept a threat before it arrives at, or leaves, the datacenter. In other embodiments, a network security system 100 monitors the traffic heading into, or out of, the datacenter, in which case the network security system 100 detects threats and generates alerts, but does not block the data. A hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In an embodiment, microservices 108-122 are implemented using computer-executable instructions loaded from the Internet via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, a network security system 100 runs on a datacenter computer. In other embodiments, however, a network security system 100 is installed and runs on any one of a wide variety of computing platforms, ranging from low-cost to high-cost, and from low-power to high power. In some embodiments, a network security system 100 runs on a server. In some embodiments, a network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, a network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
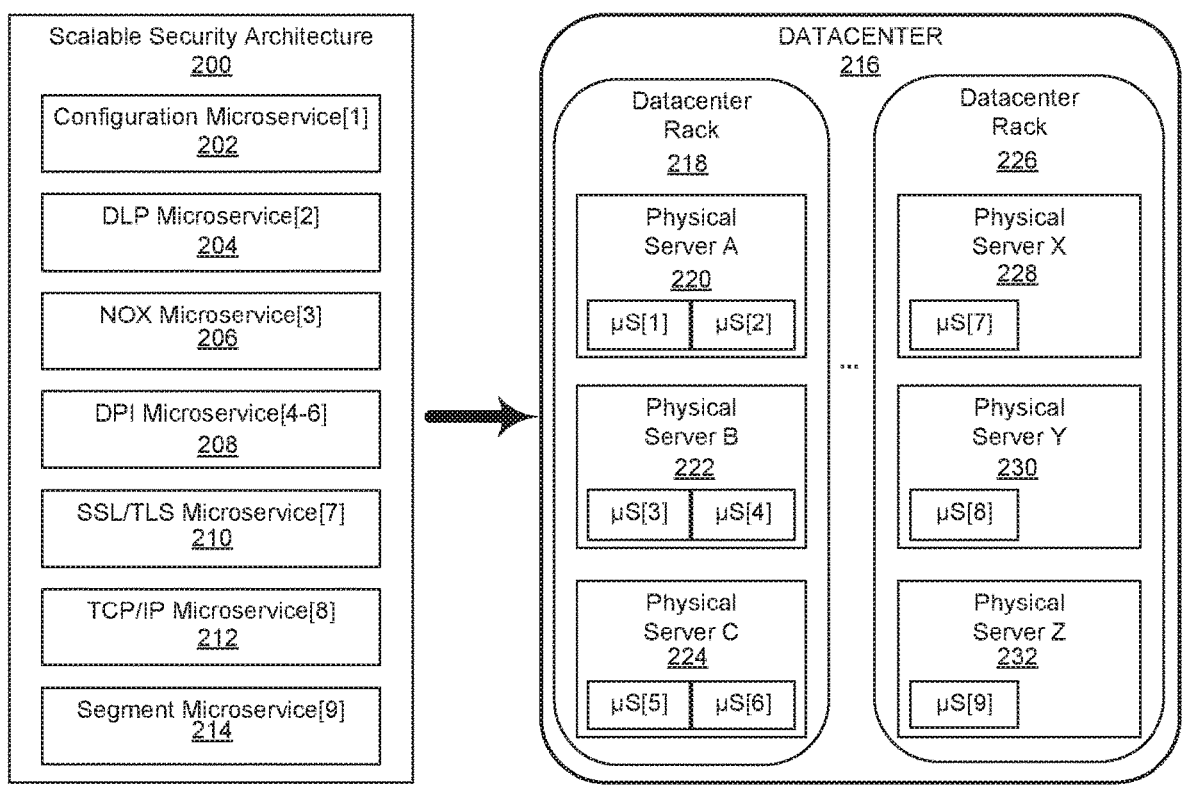
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
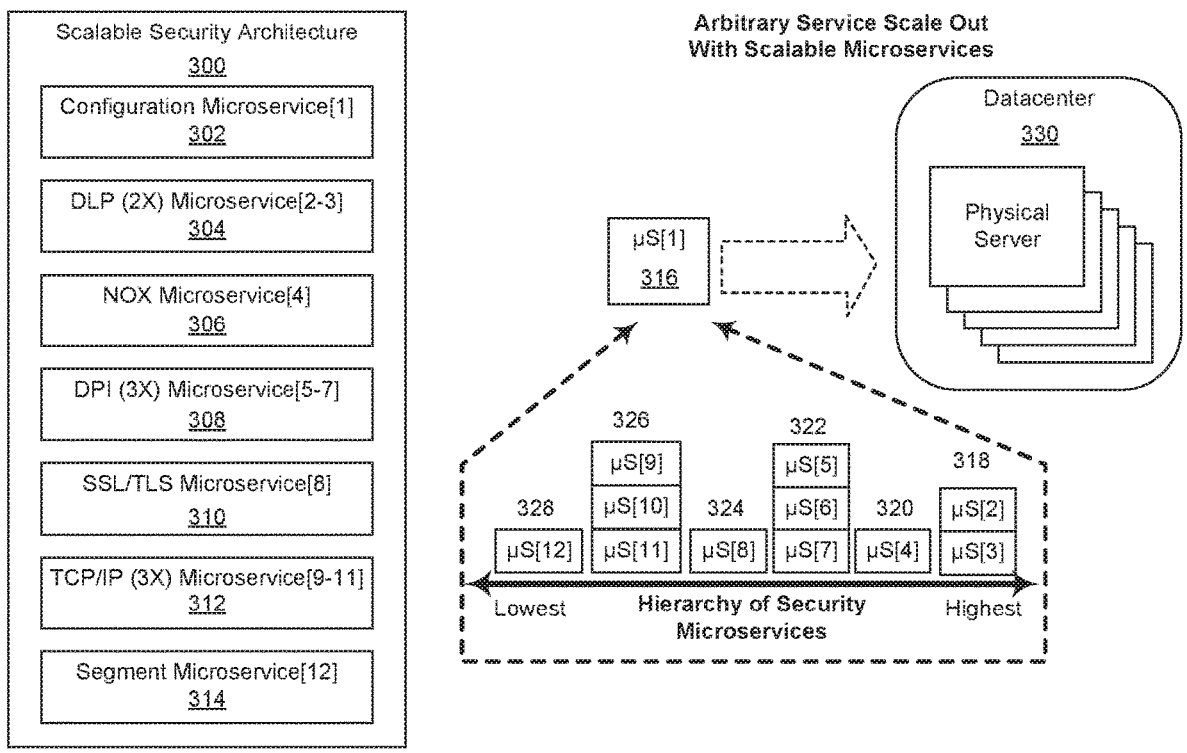
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane.

The microservices, for example, may be implemented by physical servers in datacenter 330.

Figure 4:
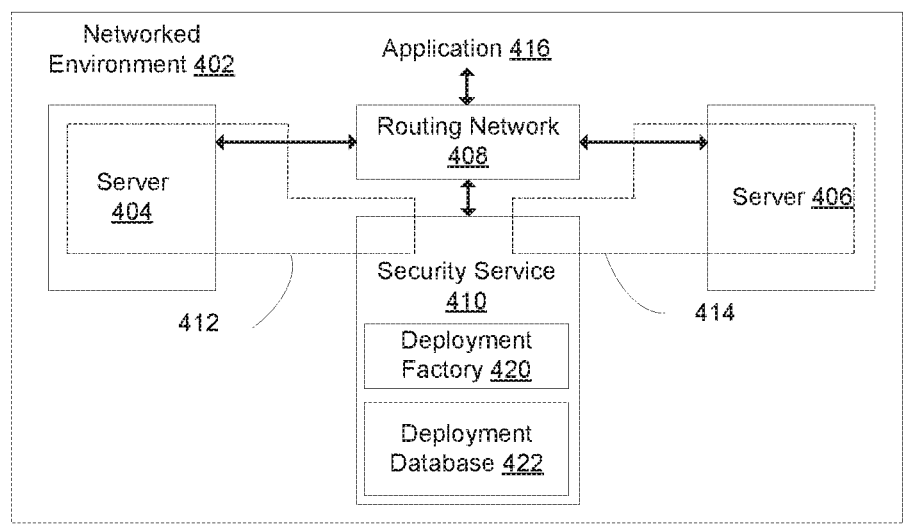
FIG. 4 is a block diagram illustrating a security service configured to monitor traffic sent among an application and one or more servers within a networked computer environment in accordance with the disclosed embodiments.

FIG. 4 is a block diagram illustrating a block diagram illustrating a security service configured to monitor traffic sent among an application and one or more servers within a networked computer environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. The security service 410 comprises one or more "microservices" used to monitor and perform various actions relative to data items (e.g. network traffic, files, email messages, etc.) sent to and received from one or more applications 416 and servers 404, 406. The microservices comprising security service 410 do not need to be confined to one physical server such as a server 404, 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404, 406, security service 410, and application 416 is deployed in a networked environment 402. Examples of networked environments 402 include data centers, an on-premise stack, and a set of servers remotely connected using a network.

In some embodiments, the security service 410 includes a deployment factory 420 and deployment database 422. In some embodiments, the deployment factory 420 is configured to receive deployment requests for the initialization of new or additional microservices, evaluate utilization and resources associated with existing microservices, modify deployment requests and deployment specifications based on its evaluations, and perform operations for the attachment of new or additional microservices in response to the deployment requests.

In some embodiments, the deployment database 422 is an information store. In some embodiments, the deployment database is configured to store deployment specifications for requested microservices that indicate the resources requests for new or additional microservices. The deployment database 422 may also store host records for hosts (e.g., server) that indicate the current resources being used by each of the hosts, their utilization history, and information regarding interface microservices currently running on each host, if any. In some embodiments, the deployment database 422 is used by the deployment factory 420 in determining how and where new security microservices are to be added to a security service or the networked environment 402.

In an embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, by virtue of routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
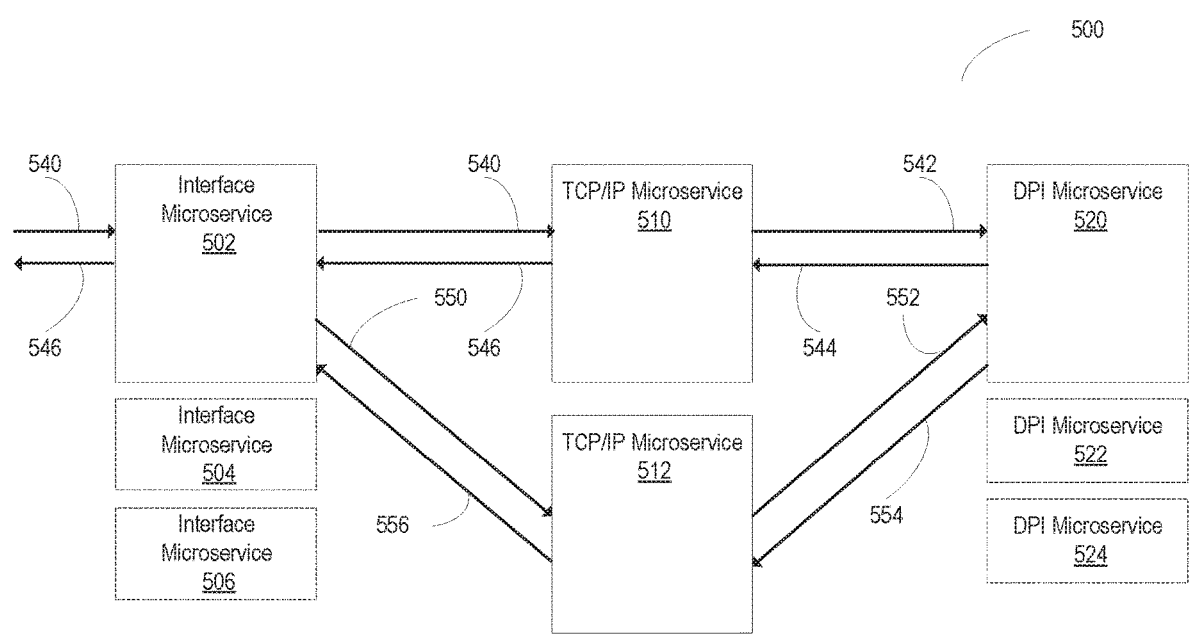
FIG. 5 is a block diagram illustrating a flow of application data through a stateless processing, fault-tolerant microservice environment in accordance with the disclosed embodiments.

FIG. 5 is a block diagram illustrating a flow of application data through a stateless processing, fault-tolerant microservice environment in accordance with disclosed embodiments. As illustrated, security system 500 includes interface microservices 502, and optionally 504, and 506, TCP/IP microservices 510 and 512, and DPI microservices 520, and optionally 522, and 524. Other examples include a different number of microservices and/or a different number of microservice types. In the example of FIG. 5, an interface microservice 502 receives traffic from a hypervisor the interface microservice 502 exists within, and can perform translation services and route traffic to other microservices. The interface microservice encapsulates the traffic (e.g., into packets) and transmits the encapsulated traffic to TCP/IP microservices 510 and 512, where TCP/IP microservices 510 and 512 are enabled to perform work on the encapsulated traffic (e.g., reassembling the packets into streams of data).

One benefit of the security system illustrated in FIG. 5 is the handling of state. For example, if packets belong to a certain context X, the security system 500 may enable both TCP/IP microservices 510 and 512 to perform meaningful work on the packets. By implementing TCP/IP processing as microservices 510 and 512 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider context obtained by TCP/IP microservice 510 as part of packets received from interface microservice 502 as transmission 540. In one embodiment, the source of transmission 540 is a hypervisor to which the interface microservice 502 is attached. Similarly, the sink of transmission 546 from interface microservice 502 may be the hypervisor. The context, when transmitted to DPI microservice 520 as part of transmission 542 along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 500 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

In an embodiment, interface microservice 502 provides packets to TCP/IP microservice 510 or 512 via path 540 or 550, respectively. For example, interface microservice 502 may conduct a load-balancing to select one of the TCIP/IP microservices to forward the packets.

In an embodiment, TCP/IP microservices 510 and 512 are stateless, but may benefit from the context generation performed by interface microservice 502. For example, whichever of TCP/IP microservices 510 and 512 receives the packet may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 5, TCP/IP microservices 510 or 512 forwards the extracted data and/or the data resulting from the security processing to DPI microservice 520 via paths 542 or 552, respectively. In an embodiment, DPI microservice 520 is also stateless and may use context provided by TCP/IP microservice 510 or 512 in transmission 542 or 552. DPI microservice 520 may load DPI processing state before processing the received data, but can perform some work (e.g., scheduling different DPI pattern state tables) 540 based on the context. Transmitting the context to the DPI microservice therefore may obviate some amount of work by the DPI microservice. If TCP/IP microservice 510 fails and interface microservice 502 instead utilizes TCP/IP microservice 512, DPI microservice 520 may obtain the context from the transmission of reassembled TCP content in transmission 552.

Although FIG. 5 does not show a second packet, when a subsequent packet associated with the same context is received, interface microservice 502 may conduct a load balancing and select one of the TCP/IP microservices to forward the packet along with the context. In one embodiment, interface microservice 502 chooses to forward the second packet to TCP/IP microservice 512 via path 550. TCP/IP microservice 512 performs some security processing, then transmits the second packet and the context to DPI microservice 520 via path 552. After performing some security processing, DPI microservice 520 responds to TCP/IP microservice 512 via path 554, and TCP/IP microservice responds to interface microservice 502 via path 556.

Summarizing the operation of an embodiment as illustrated by FIG. 5, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 5, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

Figure 6:
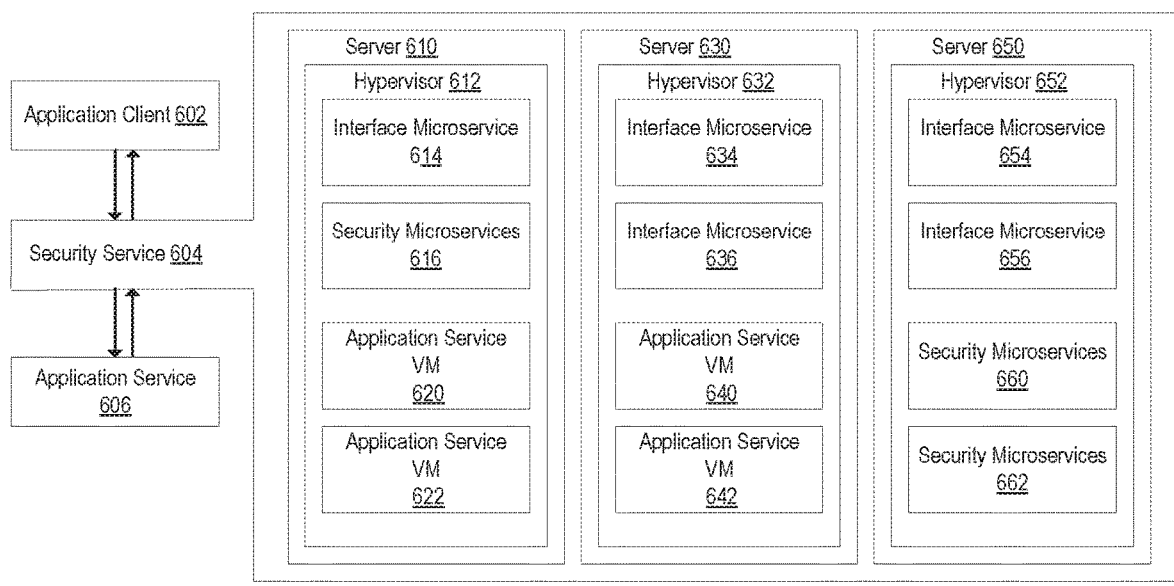
FIG. 6 is a block diagram illustrating example components of a security service in accordance with the disclosed embodiments.

FIG. 6 is a block diagram illustrating example components of a security service 604. The security service 604 may be present between an application client 602 and an application service 606, and may handle requests between the application client 602 and the application service 606, including the transmission of data between the application client 602 and the application service 606.

In one embodiment, the security service 604 comprises multiple servers 610, 630 and 650, each of which further comprising a hypervisor 612, 632, and 652, respectively. The hypervisors 612, 632, and 652 provide hardware abstraction to a virtual machine. For example, the security service 604 may correspond to the security service 410 depicted in FIG. 4. FIG. 6 represents an example embodiment that is provided for purposes of illustrating a clear example; other embodiments may use different arrangements.

Each hypervisor 612, 632 and 652 may have one or more microservices running with security service 604. As depicted in FIG. 6, the hypervisor 612 in server 610 includes an interface microservice 614, security microservices 616, and application service VMs 620 and 622. Similarly, the hypervisor 632 in server 610 includes interface microservices 634 and 636, and application service VMs 640 and 642, and the hypervisor 652 in server 610 includes interface microservices 654 and 656, and security microservices 660 and 662. For hypervisor 632, the security microservice that provides security for application service VMs 640 and 642 may be placed on a different server (e.g., 610 or 650). In embodiments, each hypervisors 612 includes at least one interface microservice. In the embodiment shown in FIG. 6, the application microservice VM 620, 622, 640 and 642 share the same physical servers as the security microservices 616, 660 and 662, providing the security services. The interface microservices 614, for example, may act as a hook into corresponding hypervisor 612, to obtain packet access, such that any data passing through the hypervisor within the server 610 is presented to an information microservice.

In some embodiments, security service 604 forwards packets received from the application client 602 and the application service 606 to an appropriate interface microservice within one of the multiple servers, which can generates a channel data encapsulation packet that is then sent to the appropriate security microservice or application service VM.

Figure 7:
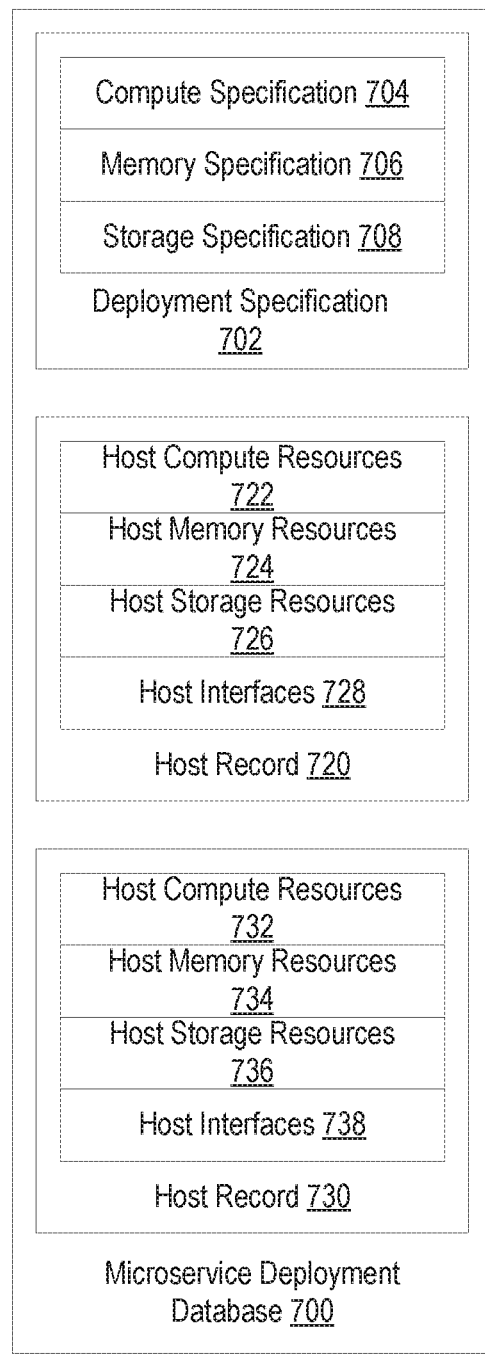
FIG. 7 illustrates a deployment database according to an embodiment.

FIG. 7 illustrates a microservice deployment database 700 according to an embodiment. In some embodiments, the microservice deployment database 700 is an information store that stores information regarding the current infrastructure of a networked environment 402, such as the one depicted in FIG. 4. In the embodiment depicted in FIG. 7, the microservice deployment database 700 includes a deployment specification 702 and host records 720 and 730. In other embodiments, the microservice deployment database 700 may include a greater or fewer number of deployment specifications and host records. In embodiments, the number of host records in the deployment database 700 is dependent upon the number of hosts (e.g., servers) in the networked environment 402.

In the embodiment depicted in FIG. 7, the deployment specification 702 includes a compute specification 704, a memory specification 706, and a storage specification 708, provides specifications for microservices. The deployment specification 702 is stored in the microservice deployment database 700 when the microservice deployment factory receives a request to add a security microservice. Host record 720 includes host compute resources 722, host memory resources 724, host storage resources 726, and host interfaces 728. Similarly, host record 730 includes host compute resources 732, host memory resources 734, host storage resources 736, and host interfaces 738. Host records 720 and 730 provide resource availability information for hosts (e.g., servers).

In one embodiment, a TCP/IP microservice may have a deployment specification indicating that the TCP/IP microservice, when deployed, requires X amount of compute, Y amount of memory, and Z amount of storage. Each microservice may have a different specification, where each specification may vary based on various factors. Certain microservices may require more memory, another microservice that logs events may require more storage, and other microservices may require a different combination of compute, memory, and storage.

In one embodiment, the deployment specification for a microservice is modified based on an analysis of existing microservices. For example, given a deployment specification for a TCP/IP microservice requiring C units of compute and M units of memory, the system may identify that the existing TCP/IP microservices do not experience issues with memory, indicating that the amount of memory request may be reduced. In such an example, the system may modify the deployment specification for the TCP/IP microservice by reducing the amount of units of memory specified in the deployment specification.

The host interfaces 728 and 738 indicate how many existing interface microservices, if any, are present in the corresponding hosts 720 and 730, respectively. Where a host interface indicates that the corresponding host does not have an existing interface microservice, a new interface microservice may need to be initialized on the host. Where the host interface indicates that the corresponding hosts has existing interface microservices, the number of existing interface microservices can be used to determine whether additional interface microservices should be initialized. As interface microservices can tax or strain a hypervisor, the number of interface microservices can be used to determine if the hypervisor can handle additional interface microservices. Using the deployment specification 702 for a microservice and host records 720 and 730, the system can determine the suitable host for deployment of the microservice by the deployment factory 422.

Figure 8:
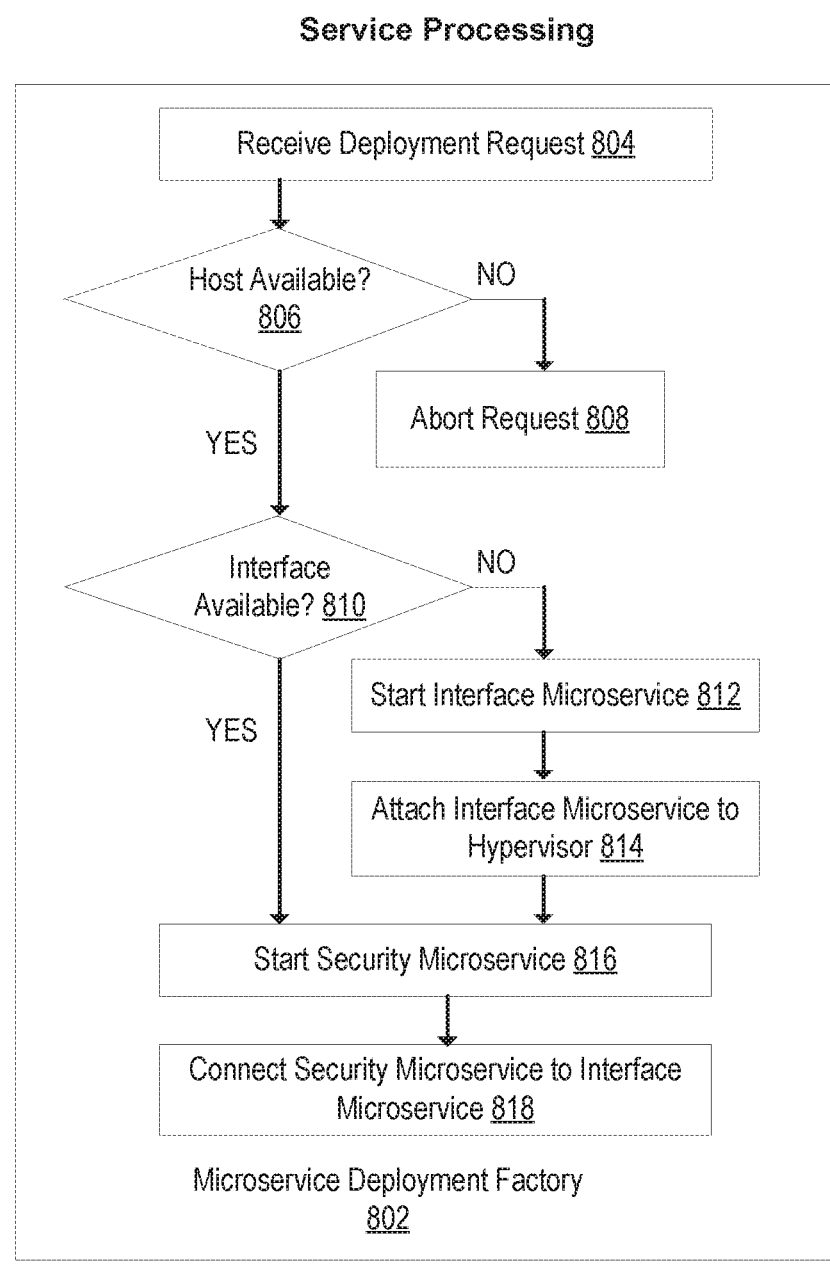
FIG. 8 is a flow diagram illustrating an example process for deploying a microservice on a host using a deployment factory according to an embodiment.

FIG. 8 is a flow diagram illustrating an example process for deploying a microservice on a host using a microservice deployment factory 802 according to an embodiment. At block 804, the microservice deployment factory 802 receives a deployment request to deploy a security microservice to a system. In some embodiments, the deployment request includes deployment specifications. In one embodiment, the deployment request is received from an existing microservice in response to an existing overloaded microservice requesting that a similar microservice be initialized to handle a portion of the traffic currently being handled by the existing microservice. In another embodiment, the microservice deployment factory 802 analyzes existing microservices and the amount of traffic they are handling, and automatically initiates a new deployment request on behalf of the existing systems.

At block 806, the microservice deployment factory 802 determines if there are any hosts (e.g., servers) available. At block 808, when the microservice deployment factory 802 determines that there are no hosts available, the request is aborted. In some embodiments, the microservice deployment factory 802 determines if a host includes less than a maximum number of interface microservices and that the security microservice to be added to the host can be merged with the existing interface microservices. In some embodiments, a host may be unavailable where it cannot handle additional microservices. When the microservice deployment factory 802 determines that there is at least one available host, the process proceeds to block 810.

At block 810, the microservice deployment factory 802 determines if an available host has an available interface microservice. In embodiments, the microservice deployment factory 802 determines whether the available host has an available interface microservice by accessing a host record for the available host stored in a deployment database. For example, referring to FIG. 7, the microservice deployment factory 802 may access host record 720 in the microservice deployment database 700 for an available host. In some embodiments, the microservice deployment factory 802 analyzes host records of the available hosts to determine the characteristics of each host, including the host compute resources 722, host memory resources 724, and host storage resources 726. The characteristics of each host is compared to the deployment specifications of the deployment request to identify the most suitable available host for placement of the security microservice. In some embodiments, the available host may have an existing interface microservice, but the existing interface microservice is not able to handle additional security microservices. In such embodiments, additional interface microservices may be added to the available host, if the available host has sufficient resources to handle the additional interface microservice.

At block 812, when the microservice deployment factory 802 determines that the host does not have an interface microservice or does not have an available interface microservice, the microservice deployment factory 802 starts an interface microservice on the available host. This interface microservice may be in addition to any existing interface microservices on the available host, or may be a first interface microservice on the available host. At block 814, the microservice deployment factory 802 then attaches the interface microservice to the hypervisor for the available host. In some embodiments, the microservice deployment database 700 is updated to indicate the addition of the new interface microservice. For example, the host interfaces section of the host record for the available host is updated to indicate that the available host has an interface microservice. This information can then be used to process future requests for new security microservices.

When the available host has an existing interface microservice available, or after a new interface microservice has been started and attached to the hypervisor for the available host, the process proceeds to block 816. At block 816, the microservice deployment factory 802 starts or initializes the requested security microservice. At block 818, the microservice deployment factory 802 connects the requested security microservice to the interface microservice of the available host. After the requested security microservice has been deployed, the requested security microservice is executed, and the requested security microservice can begin handling traffic.

Figure 9:
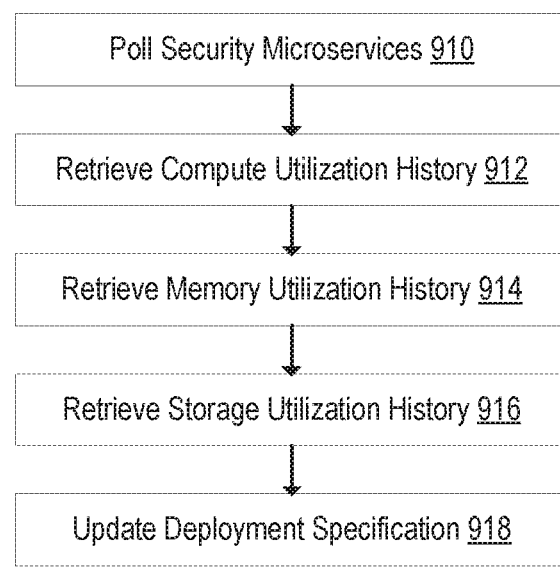
FIG. 9 is a flow diagram illustrating an example process for updating a deployment specification received in a deployment request according to an embodiment.

FIG. 9 is a flow diagram illustrating an example process for updating a deployment specification received in a deployment request according to an embodiment. At block 910, in response to receiving the deployment request to initialize a new security microservice, the microservice deployment factory 802 polls the existing security microservices. At block 912, the microservice deployment factory 802 retrieves compute utilization histories for one or more of the existing security microservices. At block 914, the microservice deployment factory 802 retrieves memory utilization histories for one or more of the existing security microservices. At block 916, the microservice deployment factory 802 retrieves storage utilization histories for one or more of the existing security microservices. Based on an analysis of the retrieved compute utilization history, memory utilization history, and storage utilization history, at block 918, the microservice deployment factory 802 updates the deployment specification for the received deployment request. For example, the microservice deployment factory 802 may increase or decrease requirements specified in the deployment specification based on the utilization histories of existing security microservices. In this manner, the microservice deployment factory 802 updates the deployment specifications of security microservices based on the resource utilization of existing microservices. This capability allows for deployment of more microservices as the resource utilization prediction is based on the actual utilization rather than a worst-case estimate or other less-accurate methods.

Figure 10:
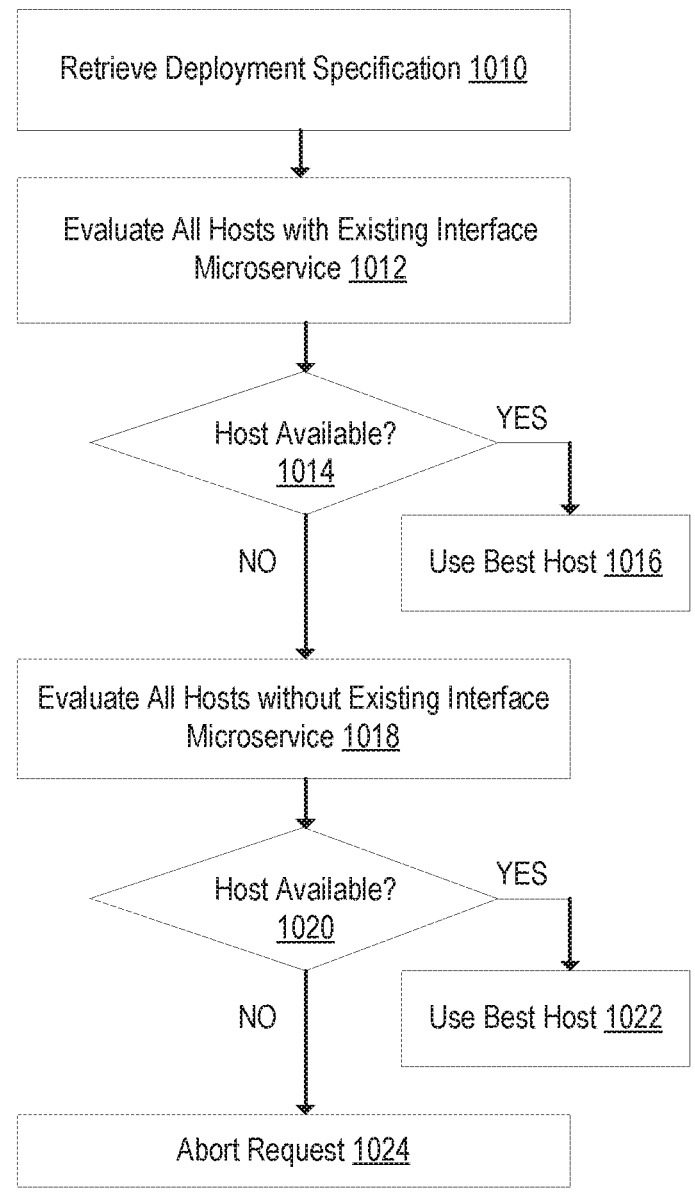
FIG. 10 is a flow diagram illustrating an example process for determining the availability of a host to satisfy a deployment request according to an embodiment.

FIG. 10 is a flow diagram illustrating an example process for determining the availability of a host to satisfy a deployment request according to an embodiment. At block 1010, the microservice deployment factory 802 receives or retrieves a deployment specification for a deployment request for a security microservice. At block 1012, the microservice deployment factory 802 evaluates hosts with existing interface microservices. In some embodiments, the microservice deployment factory 802 access or otherwise queries a microservice deployment database 700 to obtain information regarding existing hosts. For example, the microservice deployment factory 802 retrieves host records for hosts that have interface microservices already initialized within them.

At block 1014, the microservice deployment factory 802 determines if there is an available host among the hosts with existing interface microservices. In some embodiments, the microservice deployment factory 802, after determining the hosts that have existing interface microservices, determine whether any of these hosts can handle a new security microservice. For example, the microservice deployment factory 802 accesses the resources available to each host, including, for example, host computer resources 722, host memory resource 724, and host storage resources 726.

At block 1016, when there is an available host that has an interface microservice, the microservice deployment factory 802 selects the most suitable available host. In some embodiments, the microservice deployment factory 802 selects the most suitable available host based on the resources available to each available host, as defined in the corresponding host records for each available host. For example, based on the resources available to the determined hosts, microservice deployment factory 802 can determine whether there is an existing host with an interface microservice that has resources available to house the security microservice being requested in the deployment request.

The most suitable host calculation may be performed by determining which hosts have sufficient resources to satisfy the deployment specification of the microservice and selecting the host with the least available resources. This method acts to fully utilize hosts more quickly (rather than balancing hosts) such that the number of hosts with available resources decreases more quickly. Such a goal allows faster consolidation of security microservices to a smaller number of hosts, thereby freeing some hosts to perform more non-security applications without sharing resources with security services. Other methods of calculating the most suitable host, to achieve other goals such as even balancing of security microservices over datacenter servers, may also be used.

At block 1018, when the result of the analysis of block 1014 indicates that there are no available hosts with an interface microservice, the microservice deployment factory 802 evaluates hosts without existing interface microservices. In some embodiments, there may be no available hosts with interface microservices when these hosts do not have the resources to handle any additional security microservices being placed on the hosts. Similar to block 1014, the microservice deployment factory 802 may evaluate the host computer resources, host memory resource, and host storage resources associated with each host without an existing interface microservice. This data can be used by the microservice deployment factory 802 to determine which host without an existing interface microservice has the resources available needed to satisfy the resource requirements of a new interface microservice and the requested security microservice. At block 1020, the microservice deployment factory 802 determines if there is an available host among the hosts without existing interface microservices. At block 1022, when there is an available host that does not have an interface microservice, the microservice deployment factory 802 selects the most suitable available host. This may be determined based on the resources currently available to the hosts that do not have interface microservices and may be performed in a manner similar to that described for the calculation in block 1016. In such scenarios, the microservice deployment factory 802 would start and attach an interface microservice in the selected host, as described above in steps 812 and 814 of FIG. 8. At block 1024, when there are no hosts available, the request is aborted. In this situation, the microservice deployment factory 802 will have determined that there are no hosts available with existing interface microservices that can handle the requested security microservice, and that there are not hosts available without existing interface microservices that can handle the requested security microservice as well as a new interface microservice.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A computer-implemented method, comprising:
   receiving a deployment request to deploy a security microservice in a security service, the deployment request including a deployment specification;
   determining that one or more hosts are available;
   accessing one or more host records for the one or more available hosts;
   selecting an available host on which to deploy the security microservice utilizing the deployment specification and the one or more host records for the one or more available hosts;
   determining whether an interface microservice is available on the selected available host based on a host record for the selected available host;
   when the selected available host does not include existing interface microservices,
      initializing the interface microservice on the selected available host, and
      attaching the interface microservice to a hypervisor of the selected available host;
   initializing the security microservice on the selected available host;
   connecting the security microservice to the interface microservice of the selected available host; and
   executing the security microservice.

2. The method of claim 1, further comprising:
   retrieving a utilization history from one or more hosts in the security service; and
   updating the deployment specification based on an analysis of the retrieved utilization history.

3. The method of claim 2, wherein the utilization history is one or more of a compute utilization history, a memory utilization history, a storage utilization history, and a network utilization history.

4. The method of claim 1, wherein determining whether the interface microservice is available on the selected available host based on the host record for the selected available host comprises:
   analyzing the host record of the selected available host to determine characteristics of the selected available host, the characteristics for the selected available host including a compute specification, a memory specification, and a storage specification; and
   determining that the selected available host has characteristics that satisfy the deployment specification of the deployment request.

5. The method of claim 4, wherein determining that the selected available host has characteristics that satisfy the deployment specification of the deployment request comprises:
   determining that the selected available host includes less than a maximum number of interface microservices and that the security microservice to be added to the selected available host can be merged with the existing interface microservices.

6. The method of claim 1, wherein accessing the one or more host records for the one or more available hosts comprises:
   querying host records in a deployment database.

7. The method of claim 1, wherein the deployment request is received from an existing microservice in the security service.

8. The method of claim 1, wherein the deployment request is received based on an analysis of existing microservices in the security service.

9. One or more non-transitory computer-readable storage media storing instructions which, when executed by one or more hardware processors, cause performance of:
   receiving a deployment request to deploy a security microservice in a security service, the deployment request including a deployment specification;
   determining that one or more hosts are available;
   accessing one or more host records for the one or more available hosts;
   selecting an available host on which to deploy the security microservice utilizing the deployment specification and the one or more host records for the one or more available hosts;
   determining whether an interface microservice is available on the selected available host based on a host record for the selected available host;
   when the selected available host does not include existing interface microservices,
      initializing the interface microservice on the selected available host, and attaching the interface microservice to a hypervisor of the selected available host;

initializing the security microservice on the selected available host;

connecting the security microservice to the interface microservice of the selected available host; and executing the security microservice.

10. The one or more non-transitory computer-readable storage media of claim 9, wherein the instructions which, when executed by the one or more computing devices, further cause performance of:

retrieving a utilization history from one or more hosts in the security service; and updating the deployment specification based on an analysis of the retrieved utilization history.

11. The one or more non-transitory computer-readable storage media of claim 10, wherein the utilization history is one or more of a compute utilization history, a memory utilization history, a storage utilization history, and a network utilization history.

12. The one or more non-transitory computer-readable storage media of claim 9, wherein determining whether the interface microservice is available on the selected available host based on the host record for the selected available host comprises:

analyzing the host record of the selected available host to determine characteristics of the selected available host, the characteristics for the selected available host including a compute specification, a memory specification, and a storage specification; and determining that the selected available host has characteristics that satisfy the deployment specification of the deployment request.

13. The one or more non-transitory computer-readable storage media of claim 12, wherein determining that the selected available host has characteristics that satisfy the deployment specification of the deployment request comprises:

determining that the selected available host includes less than a maximum number of interface microservices and that the security microservice to be added to the selected available host can be merged with the existing interface microservices.

14. The one or more non-transitory computer-readable storage media of claim 9, wherein accessing the one or more host records for the one or more available hosts comprises:

querying host records in a deployment database.

15. The one or more non-transitory computer-readable storage media of claim 9, wherein the deployment request is received from an existing microservice in the security service.

16. The one or more non-transitory computer-readable storage media of claim 9, wherein the deployment request is received based on an analysis of existing microservices in the security service.

17. An apparatus, comprising:

one or more hardware processors;

memory coupled to the one or more hardware processors, the memory storing instructions which, when executed by the one or more hardware processors, causes the apparatus to:

receive a deployment request to deploy a security microservice in a security service, the deployment request including a deployment specification;

determine that one or more hosts are available;

access one or more host records for the one or more available hosts;

select an available host on which to deploy the security microservice utilizing the deployment specification and the one or more host records for the one or more available hosts;

determine whether an interface microservice is available on the selected available host based on a host record for the selected available host;

when the selected available host does not include existing interface microservices, initialize the interface microservice on the selected available host, and attach the interface microservice to a hypervisor of the selected available host;

initialize the security microservice on the selected available host;

connect the security microservice to the interface microservice of the selected available host; and execute the security microservice.

18. The apparatus of claim 17, wherein the instructions which, when executed by the one or more hardware processors, further causes the apparatus to:

retrieve a utilization history from one or more hosts in the security service; and update the deployment specification based on an analysis of the retrieved utilization history.

19. The apparatus of claim 17, wherein determining whether the interface microservice is available on the selected available host based on the host record for the selected available host comprises:

analyzing the host record of the selected available host to determine characteristics of the selected available host, the characteristics for the selected available host including a compute specification, a memory specification, and a storage specification; and determining that the selected available host has characteristics that satisfy the deployment specification of the deployment request.

20. The apparatus of claim 19, wherein determining that the selected available host has characteristics that satisfy the deployment specification of the deployment request comprises:

determining that the selected available host includes less than a maximum number of interface microservices and that the security microservice to be added to the selected available host can be merged with the existing interface microservices.

* * * * *